(12) United States Patent
Kim et al.

(10) Patent No.: US 10,116,150 B2
(45) Date of Patent: Oct. 30, 2018

(54) CONDUCTIVE PLATE AND ELECTRONIC DEVICE HAVING THE SAME

(71) Applicant: SAMSUNG ELECTRO-MECHANICS CO., LTD., Suwon-si (KR)

(72) Inventors: Hee Seung Kim, Suwon-si (KR); Jae Sun Won, Suwon-si (KR); Myung Hyun Sung, Suwon-si (KR); Tae Seok Yang, Suwon-si (KR); Soon Joung Yio, Suwon-si (KR); Hak Ryong Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 97 days.

(21) Appl. No.: 15/178,177

(22) Filed: Jun. 9, 2016

(65) Prior Publication Data

US 2017/0077727 A1 Mar. 16, 2017

(30) Foreign Application Priority Data

Sep. 11, 2015 (KR) .................. 10-2015-0129335
Nov. 26, 2015 (KR) .................. 10-2015-0166737

(51) Int. Cl.
*H02J 7/00* (2006.01)
*H02J 7/02* (2016.01)
(Continued)

(52) U.S. Cl.
CPC ............ *H02J 7/0042* (2013.01); *H02J 7/025* (2013.01); *H02J 50/10* (2016.02);
(Continued)

(58) Field of Classification Search
CPC ........ H02J 7/025; H01F 38/14; Y02T 90/122; B60L 11/182; Y02E 60/12
(Continued)

(56) References Cited

U.S. PATENT DOCUMENTS

| 9,871,384 B2 * | 1/2018 | Von Novak, III ...... H02J 5/005 |
| 2008/0297107 A1 * | 12/2008 | Kato ................... H01F 27/2871 320/108 |

(Continued)

FOREIGN PATENT DOCUMENTS

| CN | 102956974 A | 3/2013 |
| CN | 103370772 A | 10/2013 |

(Continued)

OTHER PUBLICATIONS

Korean Office Action dated Jan. 18, 2017 in counterpart Korean Patent Application No. 10-2015-0166737 (18 pages, in Korean with English translation).
(Continued)

*Primary Examiner* — Arun Williams
(74) *Attorney, Agent, or Firm* — NSIP Law

(57) ABSTRACT

A conductive plate and an electronic device including the same are provided. A conductive plate to be included in a terminal and disposed on a side of a coil substrate for wireless charging the terminal includes metal members each having a plate shape and an insulating layer disposed on a surface of at least one of the metal members to insulate the metal members from each other, wherein the metal members are coupled to each other to complete a flat plate shape.

8 Claims, 5 Drawing Sheets

(51) Int. Cl.
    *H02J 50/10* (2016.01)
    *H04M 1/02* (2006.01)
    *H01M 2/10* (2006.01)

(52) U.S. Cl.
    CPC ........ *H04M 1/0202* (2013.01); *H01M 2/1066* (2013.01); *H01M 2220/30* (2013.01)

(58) Field of Classification Search
    USPC .......................................................... 320/108
    See application file for complete search history.

(56) References Cited

U.S. PATENT DOCUMENTS

| | | | | |
|---|---|---|---|---|
| 2013/0015718 A1* | 1/2013 | Jung | .................... | H04B 5/0037 |
| | | | | 307/104 |
| 2013/0099730 A1* | 4/2013 | Yoon | ..................... | H05K 1/165 |
| | | | | 320/108 |
| 2013/0207852 A1 | 8/2013 | Nakano | | |
| 2013/0320326 A1* | 12/2013 | Kurihara | ................ | C08F 20/28 |
| | | | | 257/40 |
| 2014/0065948 A1* | 3/2014 | Huang | ................ | H05K 5/0086 |
| | | | | 455/7 |
| 2014/0218250 A1 | 8/2014 | Kim et al. | | |
| 2015/0050968 A1 | 2/2015 | Jeon et al. | | |
| 2015/0077296 A1* | 3/2015 | An | .......................... | H01Q 1/22 |
| | | | | 343/720 |
| 2015/0137742 A1 | 5/2015 | Tseng et al. | | |
| 2015/0348696 A1* | 12/2015 | Lohr | .................... | H01F 27/2804 |
| | | | | 336/84 C |
| 2016/0094045 A1* | 3/2016 | Bae | ....................... | H02J 7/0042 |
| | | | | 307/104 |
| 2017/0077727 A1* | 3/2017 | Kim | ....................... | H02J 7/0042 |

FOREIGN PATENT DOCUMENTS

| | | |
|---|---|---|
| CN | 103515698 A | 1/2014 |
| CN | 203466587 U | 3/2014 |
| CN | 104659927 A | 5/2015 |
| JP | 2012-60372 A | 3/2012 |
| JP | 3194014 U | 10/2014 |
| KR | 10-2014-0100384 A | 8/2014 |
| KR | 10-2015-0012312 A | 2/2015 |
| KR | 10-2015-0020006 A | 2/2015 |
| WO | WO 2013/181157 A1 | 2/2015 |

OTHER PUBLICATIONS

Chinese Office Action dated Aug. 1, 2018 in corresponding Chinese Patent Application No. 201610537590.0 (14 pages in English and 8 pages in Chinese).

* cited by examiner

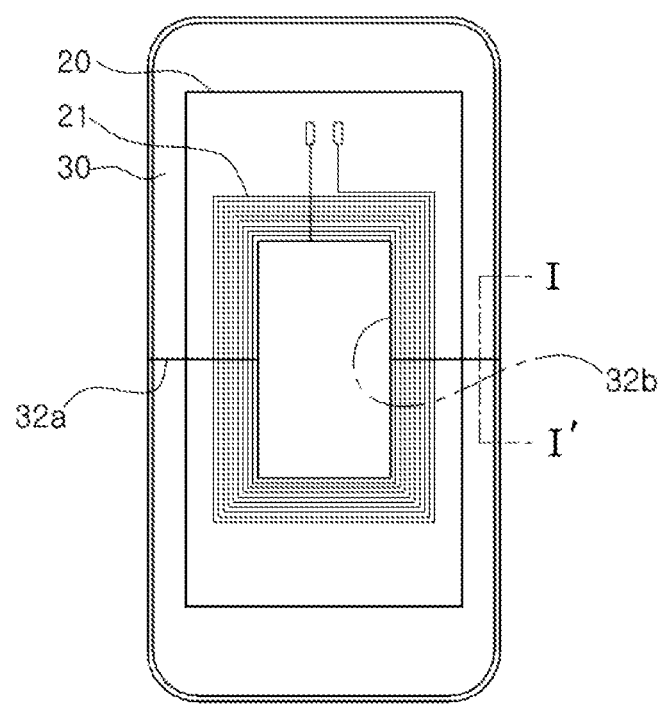
FIG. 3
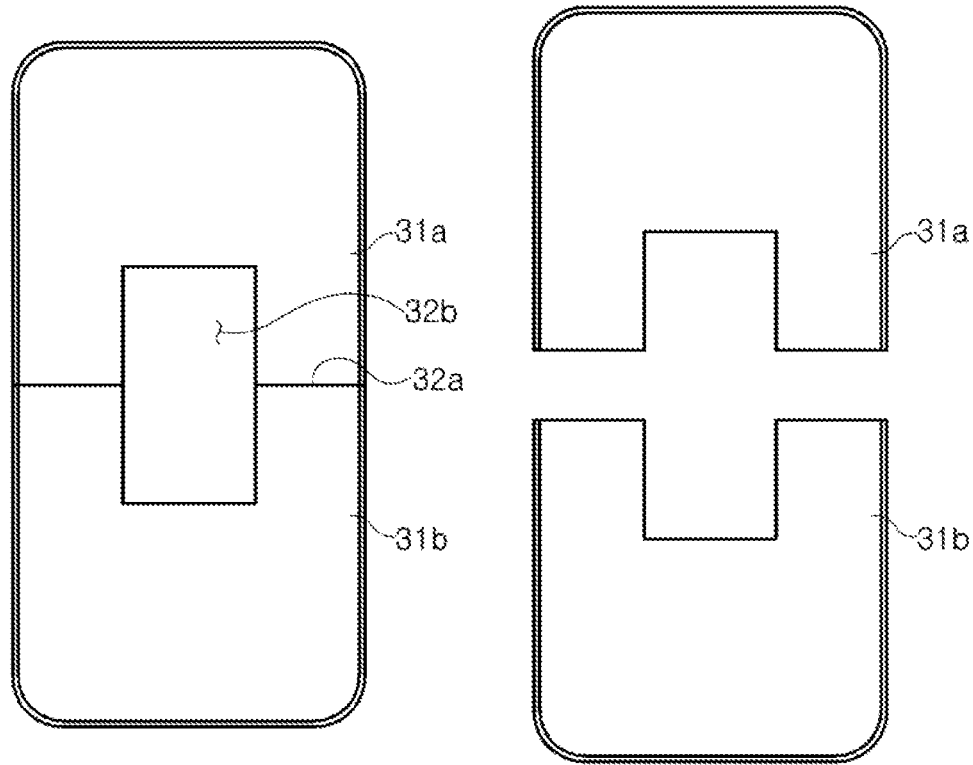
FIG. 4A
FIG. 4B

I-I'

I-I'

CONDUCTIVE PLATE AND ELECTRONIC DEVICE HAVING THE SAME

CROSS-REFERENCE TO RELATED APPLICATION(S)

This application claims the benefit under 35 USC 119(a) of Korean Patent Application No. 10-2015-0129335 filed on Sep. 11, 2015 and Korean Patent Application No. 10-2015-0166737 filed on Nov. 26, 2015, respectively, in the Korean Intellectual Property Office, the entire disclosures of which are incorporated herein by reference for all purposes.

BACKGROUND

1. Field

The present description relates to a conductive plate through which an electromagnetic wave or a magnetic field may be transmitted, and an electronic device having the same.

2. Description of Related Art

A portable terminal such as a cellular phone may be provided with a metal case in consideration of a design factor. However, producing a back cover of a portable terminal with a metallic material may reduce a coupling coefficient that determines the efficiency of a wireless power transmission, thereby significantly degrading the wireless charging efficiency of the portable terminal and making it difficult to wirelessly charge the portable terminal.

Therefore, a metal case that is capable of increasing the efficiency of wireless charging is desirable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a conductive plate to be included in a terminal and disposed on a side of a coil substrate for wireless charging the terminal includes metal members each having a plate shape and an insulating layer disposed on a surface of at least one of the metal members to insulate the metal members from each other, wherein the metal members are coupled to each other to complete a flat plate shape.

The conductive plate may be a rear cover of the terminal.

The conductive plate may be a heat radiating member to be disposed between a rear cover of the terminal and the coil substrate.

The insulating layer may include an oxidation film formed on at least one of the metal members.

The metal members may include aluminum, and the insulating layer may include an oxidation film formed by anodizing at least one of the metal members.

A contact line joining the metal members may be disposed to overlap with a winding center of the coil substrate.

The general aspect of the conductive plate may further include an extension part disposed on a contact line at which the metal members meet to partially space the metal members apart from each other.

The extension part may have a size corresponding to an inner space of the coil substrate.

In another general aspect, an electronic device includes a device body, at least one coil substrate electrically connected to the device body, and a conductive plate disposed on a side of the coil substrate and formed by connecting separate plates to each other so that side surfaces of the separate plates contact each other.

The conductive plate may be a battery cover of the electronic device.

The general aspect of the electronic device may further include a cover disposed at the outside of the conductive plate and coupled to the device body, and the conductive plate may serve as a heat radiating member disposed between the coil substrate and the cover to transfer heat generated by the coil substrate to the cover.

At least one of the separate plates may include a metal member having a plate shape and an insulating layer disposed on the metal member.

The metal member may include an aluminum material, and the insulating layer may include an oxidation film formed by anodizing the metal member.

The separate plates may include metal members, and the metal members of the separate plates may be spaced apart from each other by 25 µm to 50 µm by an insulating material disposed between the metal members.

In another general aspect, an electronic device cover includes a conductive plate configured to be disposed on a device body of an electronic device, and a dielectric portion disposed within the conductive plate through which a magnetic field generated by a wireless charger reaches a coil substrate when the electronic device is wirelessly charged.

The conductive plate may include two or more metal plates, and the dielectric portion may include a slit of a dielectric material disposed between the two or more metal plates.

A hole may be disposed in the conductive plate at an interface between the two or more metal plates.

A dielectric plate may be disposed in the conductive plate between the two or more metal plates, the dielectric plate configured to overlap with the coil substrate.

At least a portion of the conductive plate may be configured to detachably couple to the device body, a hole may be disposed in the conductive plate, and a location of the hole may overlap with a location of a coil wiring of the coil substrate when the electronic device is wirelessly charged.

Other features and aspects will be apparent from the following detailed description, the drawings, and the claims.

BRIEF DESCRIPTION OF DRAWINGS

FIG. 3 is a plan view schematically illustrating an embodiment of a cover illustrated in FIG. 2.

FIGS. 4A and 4B are plan views schematically illustrating an embodiment of a division cover illustrated in FIG. 3.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
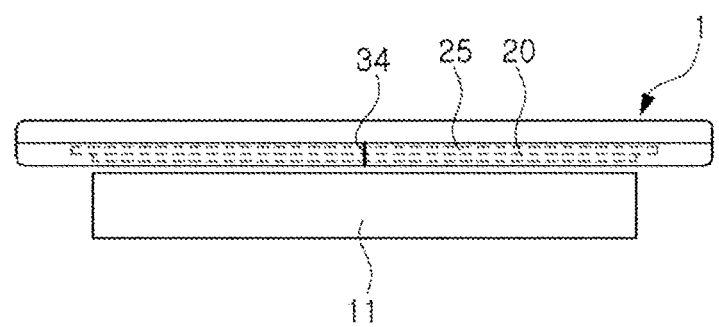
FIG. 1 is a side view schematically illustrating an embodiment of a wireless charging system according to the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the specification, it is to be understood that when an element, such as a layer, region or substrate, is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, other elements or layers intervening therebetween cannot be present. Like numerals refer to like elements throughout. As used herein, the term "and/or" includes any and all combinations of one or more of the associated listed items.

Although terms such as "first," "second," and "third," may be used herein to describe various members, components, regions, layers and/or sections, these members, components, regions, layers, or sections are not to be limited by these terms. These terms are only used to distinguish one member, component, region, layer or section from another member, component, region, layer or section. Thus, a first member, component, region, layer or section discussed in examples below may also be referred to as a second member, component, region, layer or section without departing from the teachings of the examples.

Spatially relative terms such as "above," "upper," "below," and "lower" may be used herein for ease of description to describe one element's relationship to one or more other elements as shown in the figures. It is to be understood that the spatially relative terms are intended to encompass different orientations of the device in use or operation in addition to the orientation depicted in the figures. For example, if the device in the figures is turned over, elements described as being "above" another element or being an "upper" element will then be "below" the other element or will be a "lower" element. Thus, the term "above" can encompass both the above and below orientations depending on a particular direction of the figures. The device may also be oriented in other ways (for example, rotated 90 degrees or at other orientations) and the spatially relative descriptors used herein are to be interpreted accordingly.

The terminology used herein is for describing various examples only and is not to be used to limit the present disclosure. As used herein, the singular terms "a," "an," and "the" are intended to include the plural forms as well, unless the context clearly indicates otherwise. Further, as used herein, the terms "include," "comprises," and "have" specify the presence of stated features, numbers, operations, members, elements, and/or combinations thereof, but do not preclude the presence or addition of one or more other features, operations, members, elements, and/or combinations thereof.

Hereinafter, examples will be described with reference to schematic diagrams. In the drawings, due to manufacturing techniques and/or tolerances, for example, modifications of the shape shown may be estimated. Thus, the examples described herein are not to be construed as being limited to the particular shapes of regions shown herein, but are to be construed as including changes in shape that occur during manufacturing. The features of the examples described herein may be combined in various ways as will be apparent to one of ordinary skill in the art. Further, although the examples described below have a variety of configurations, other configurations are possible as will be apparent to one of ordinary skill in the art.

Figure 2:
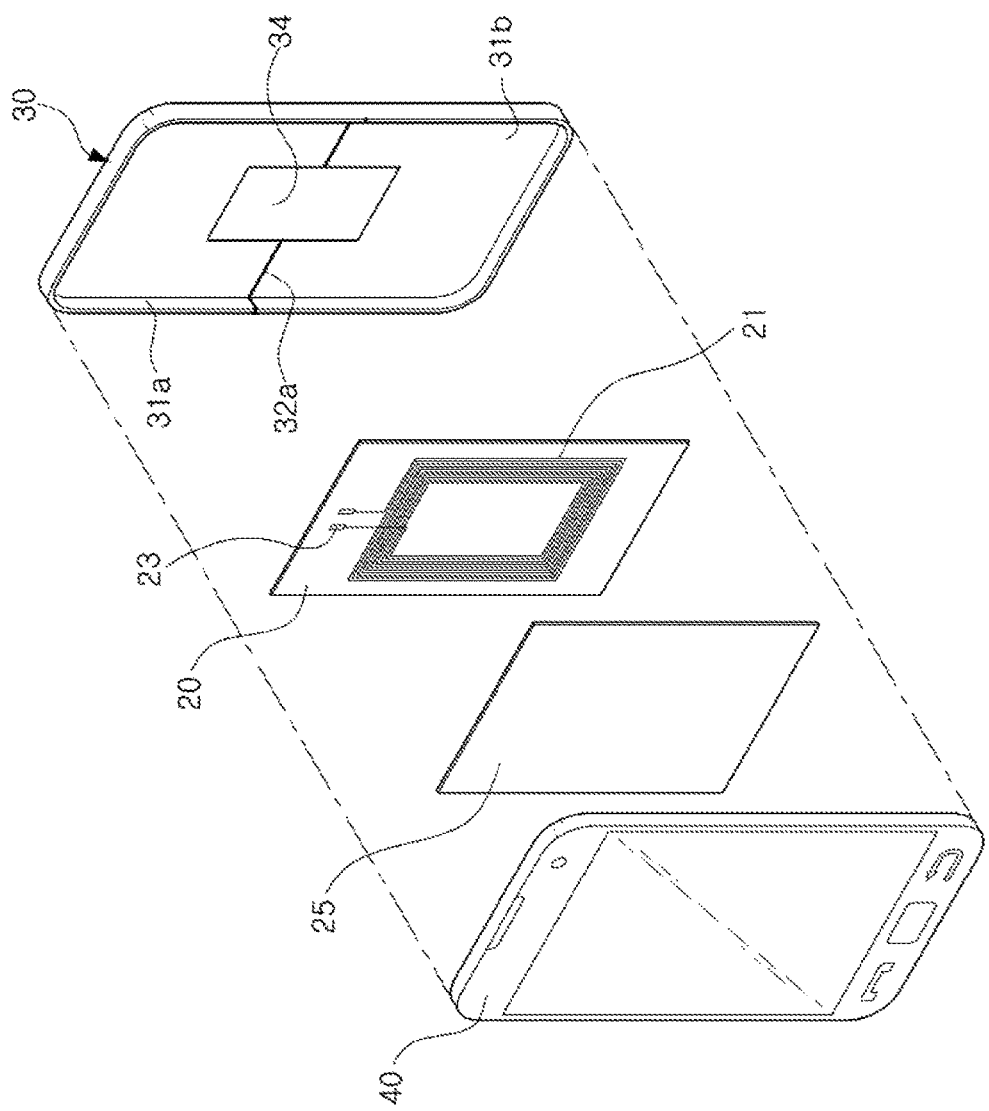
FIG. 2 is an exploded perspective view of an embodiment of a portable terminal according to the present disclosure.

FIG. 1 is a side view schematically illustrating an embodiment of a wireless charging system according to the present disclosure. FIG. 2 is an exploded perspective view of an embodiment of a portable terminal according to the present disclosure. FIG. 3 is a plan view schematically illustrating an embodiment of a cover illustrated in FIG. 2.

Figure 5:
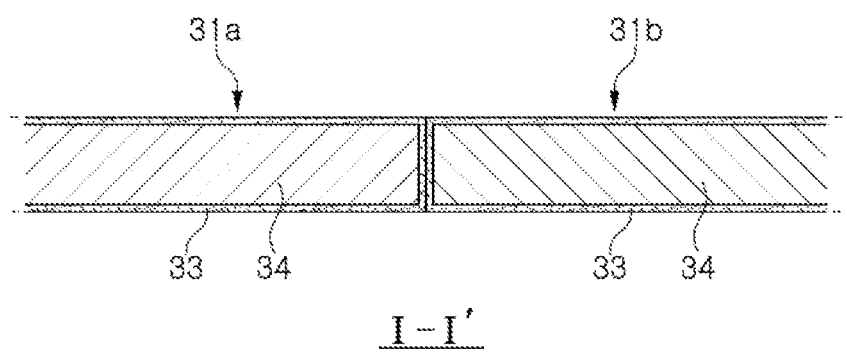
FIG. 5 is a cross-sectional view of an embodiment of a cover taken along line A-A of FIG. 3.

Further, FIGS. 4A and 4B are plan views schematically illustrating an embodiment of a division cover illustrated in FIG. 3, and FIG. 5 is a cross-sectional view of an embodiment of a cover taken along line A-A of FIG. 3. Here, FIG. 4B illustrates a state in which the separate plates of the division cover illustrated in FIG. 4A are separated from each other.

According to an embodiment of the present disclosure, an electronic device may be efficiently charged by a wireless charger even when a cover for the electronic device is formed substantially of a metallic material.

Referring to FIGS. 1 through 5, a wireless charging system according to an embodiment in the present disclosure is illustrated. A system charging an electronic device such as a portable terminal 1 with electricity may include the portable terminal 1 and a charger 11 that wirelessly transmits power to the portable terminal 1.

FIG. 1 illustrates an example in which a cover 30 of the portable terminal 1 is placed on the charger 11, and a coil substrate 20 and a shield sheet 25 are disposed inside the cover 30 of the portable terminal 1.

The portable terminal 1 may be positioned on the charger 11 to receive power from the charger 11 and to store the received power in a battery (not illustrated) inside the portable terminal 1.

To this end, the portable terminal 1 according to the illustrated embodiment includes a terminal body 40, the cover 30, a conductive plate, and the coil substrate 20 disposed between the terminal body 40 and the cover 30, as illustrated in FIG. 2.

The coil substrate 20 is disposed in the portable terminal 1, and includes an insulating substrate and a coil wiring 21 formed on the insulating substrate.

The insulating substrate may be a thin film substrate or a flexible board such as a flexible printed circuit board (FPCB), for example. However, the insulating substrate is not limited thereto.

The coil wiring 21 may be formed as a circuit wiring on at least any one surface of the insulating substrate. The coil wiring 21 according to the present embodiment may be formed in a vortex shape on a plane defined by the insulating substrate, and may have contact pads 23 formed at both ends thereof. The contact pads 23 may electrically connect the coil wiring 21 to the terminal body 40.

Referring to FIG. 2, an embodiment of a coil wiring 21 having a quadrangular vortex shape is illustrated by way of example. However, the shape of the coil wiring 21 is not limited thereto and may be variously applied. For instance, the coil wiring 21 may be formed in a circular vortex shape, a polygonal vortex shape, and the like in another example.

An insulating protection layer (not illustrated) for protecting the coil wiring 21 from the outside may be formed on the coil wiring 21.

In the illustrated example, the shield sheet 25 is disposed on one side of the coil substrate 20. The shield sheet 25 may be provided to efficiently form a magnetic path for a magnetic field generated by the charger 11.

To this end, the shield sheet 25 may be formed in a flat plate shape (or a sheet shape), and may be configured of a magnetic sheet such as a ferrite sheet, or a metal sheet such as an aluminum sheet. However, the shield sheet 25 is not limited thereto.

Meanwhile, the shield sheet 25 is not limited to the above-mentioned configuration and may be variously applied. In another example, the shield sheet 25 may be formed by applying ferrite powder particles or conductive powder particles to one surface of the coil substrate 20.

In this example, the cover 30 is a rear cover coupled to the terminal body 40 to complete the portable terminal 1. The cover 30 may be a battery cover that may be separated from the terminal body 40 when the battery is being replaced. However, the cover 30 is not limited thereto, and may also include an integral cover, which may be relatively difficult to separate from the terminal body 40.

The cover 30 may be formed of metal (e.g., aluminum, or the like), and may include at least two separate plates 31a and 31b coupled to each other to complete a flat plate shape.

In a case in which the entirety of the cover 30 is formed of a metallic material, because the magnetic field generated by the charger 11 is shielded by the cover 30, power may not be properly transmitted to the coil substrate 20.

To this end, the cover 30 according to the present embodiment includes a plurality of separate plates 31a and 31b. The present embodiment describes an example in which the cover 30 includes two separate plates 31a and 31b. However, the configuration of the cover 30 is not limited thereto, and may be variously modified. For instance, in another example, the cover 30 may include three or more separate plates 31a and 31b. In yet another example, one separate plate may be positioned within a larger separate plate.

Referring to FIG. 2, a side of one separate plate 31a and a side of another separate plate 31b are coupled to each other in a direct contact to thereby complete the cover 30. The contact surfaces on which the separate plates 31a and 31b contact each other may be configured such a way that a tight coupling is achieved with no spaces therebetween.

Therefore, it may be difficult to identify a line 32a (hereinafter, referred to as a contact line) formed by the contact between the separate plates 31a and 31b with the naked eye, and the separate plates 31a and 31b may be recognized as one cover 30 not divided unless being closely inspected.

The separate plates 31a and 31b may be formed of metal, and at least one of the separate plates 31a and 31b may have an insulating layer 33 formed on an outer surface of a metal member 34 as illustrated in FIG. 5.

In one embodiment, the separate plates 31a and 31b may be formed of an aluminum material, and the insulating layer 33 may be formed by an oxidation film formed by anodizing the aluminum material of at least one of the separate plates 31a and 31b.

Even when the separate plates 31a and 31b are coupled to each other, the electrical insulation between the metal members 34 may be maintained by the insulating layer 33.

In other words, the cover 30 according to the present embodiment may be recognized as a member configured by one metal plate at first appearance, but the cover 30 may comprise of a plurality of separate plates 31a and 31b that are substantially coupled in close contact with each other, thereby completing an integrated appearance of a cover 30. Within such a cover 30, the respective separate plates 31a and 31b may maintain an electrical insulation therebetween by the presence of the insulating layer 33.

Accordingly, the metal members 34 of the separate plates 31a and 31b may be disposed to be immediately adjacent to each other, and may be spaced apart from each other by a distance corresponding to a thickness of each insulating layer 33. In an example in which the insulating layer 33 is formed by anodizing, the insulating layer may be formed to have the thickness of about 25 μm or more, and a maximum thickness of the insulating layer may be differently formed depending on thicknesses of the separate plates 31a and 31b. Therefore, according to one embodiment, a minimum spaced distance of the metal members 34 may be about 50 μm.

Meanwhile, the present embodiment describes a case in which the insulating layer 33 is formed on the entirety of outer surfaces of the separate plates 31a and 31b, by way of example. However, the configuration of the present disclosure is not limited thereto, and the insulating layer 33 may also be partially formed only on the contact surface on which the separate plates 31a and 31b are in contact with each other.

In addition, at least one extension part 32b may be formed in the cover 30. The extension part 32b may be formed on the contact line 32a on which the separate plates 31a and 31b are in contact with each other, and may be formed to partially space the separate plates 31a and 31b that are in contact with each other.

Therefore, the extension part 32b may be partially formed from both the respective separate plates 31a and 31b, and a shape thereof may be completed when the separate plates 31a and 31b are coupled to each other. However, the configuration of the extension part 32b is not limited thereto. For instance, in another example, the extension part 32b may be defined by only one of the separate plates 31a and 31b.

The extension part 32b may be formed to correspond to a size and a shape of an inner space of the coil wiring 21. For instance, in an embodiment, the extension part 32b may be formed to have the same area as the inner space of the coil wiring 21, or may be formed to have an area greater than the inner space of the coil wiring 21. In another embodiment, the extension part 32b may have substantially the same area as the outer contour of the coil wiring 21.

Therefore, the extension part 32b and the inner space of the coil wiring 21 may be formed to have the same contours, or the extension part 32b may be formed to have an extended area as compared to the inner space of the coil wiring 21.

In addition, referring to FIG. 4B, an interior of the extension part 32b may be formed as an empty space, but is not limited thereto. That is, when the separate plates 31a and 31b are coupled to each other, the extension part 32b may form a hole. However, in another example, the interior of the extension part 32b may be filled with an insulating member such as a resin, forming a dielectric plate between the separate plates 31a and 31b.

The present embodiment describes a case in which the extension part 32b is formed to have a quadrangular shape, by way of example. However, the configuration of the present disclosure is not limited thereto. For example, the extension part may be formed in various shapes such as a circular shape, an elliptical shape, and the like to correspond to a shape of the coil wiring.

Meanwhile, although not illustrated, the portable terminal 1 according to the present embodiment may further include a fixing member for integrally fixing the separate plates 31a and 31b.

The fixing member may be formed as a bracket fixing and may couple the separate plates 31a and 31b to each other. In another embodiment, the fixing member may be formed as an injection molded product made of a resin material. The injection molded product may be formed by a double injection molding scheme in which the separate plates 31a and 31b are disposed in the mold and a molding resin is then injected thereto.

In yet another embodiment, the fixing member may be formed as a flat sheet. The fixing member may be bonded to one surface of the cover 30 by adhesive member.

Various other modifications may be possible, and these modifications are within the scope of the present disclosure. For instance, in another embodiment, after two covers of which directions of contact lines are differently formed are prepared, the two covers may be bonded to form one cover, and the like.

In another embodiment, a separate fixing member may be omitted, and the separate plates 31a and 31b may be each coupled to a rear surface of the terminal body 40 of the portable terminal. In this case, the separate plates 31a and 31b may be coupled to the terminal body to maintain the shape of the cover 30 illustrated in FIG. 3.

Next, an embodiment of a method of manufacturing a portable terminal will be described.

Referring to FIG. 5, first, separate plates 31a and 31b individually formed of a metal member 34 such as aluminum are prepared.

Next, an insulating layer 33 may be formed on surfaces of the metal members 34. In the present operation, a method for forming an oxidation film on surfaces of the separate plates 31a and 31b by an anodizing scheme may be used.

Next, an operation of coupling the separate plates 31a and 31b to each other to be in contact with each other and completing a cover 30 may be performed. In this example, even when the respective separate plates 31a and 31b are in contact with each other, the insulating layer 33 provides electrical insulation between the separate plates 31a and 331b.

Meanwhile, the present operation may further include an operation of fixing the separate plates 31a and 31b by a separate fixing member (not illustrated), but is not limited thereto.

In the portable terminal 1 according to the present embodiment configured as described above, because a magnetic field is formed by an extension part 32b and a contact line 32a of the cover 30, an inductance coupling coefficient between the charger 11 and the coil wiring 21 may be increased. Therefore, even in the case that the cover 30 of the portable terminal 1 is formed of metal, efficiency of a wireless charging may be increased.

In addition, according to one embodiment, the cover 30 is configured of a plurality of separate plates 31a and 31b, but the separate plates 31a and 31b are disposed to be maximally close to each other. Therefore, there is no need to space the separate plates 31a and 31b from each other or interpose a separate insulating member between the separate plates 31a and 31b, and the portable terminal may be easily manufactured and a design thereof may be easily utilized.

While FIG. 5 illustrates a case in which the insulating layer 33 is formed on the entire surfaces of the separate plates 31a and 31b, by way of example, the configuration of the present disclosure is not limited thereto.

Figure 6:
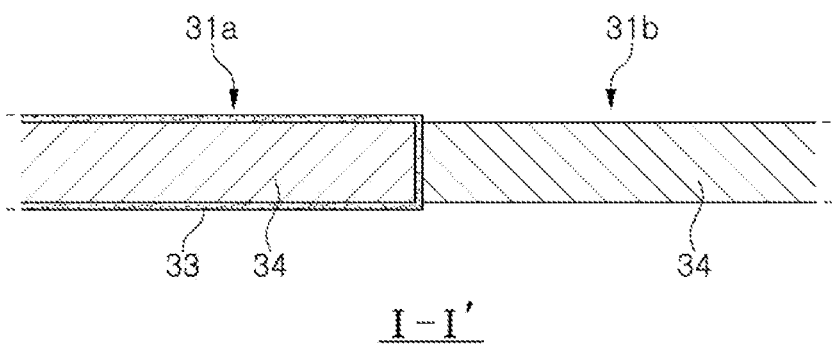
FIG. 6 is a cross-sectional view schematically illustrating another embodiment of a cover according to the present disclosure.

FIG. 6 is a cross-sectional view schematically illustrating a cover according to another embodiment in the present disclosure taken along line A-A of FIG. 3.

Referring to FIG. 6, the insulating layer 33 is only formed on one division plate 31a among the two separate plates 31a and 31b that contact each other, and the other division plate 31b is used without any insulating layer. Because the insulating layer 33 is interposed between the contact surfaces of the separate plates 31a and 31b, the insulating layer 33 provides an electrical insulation between the separate plates 31a and 31b.

According to one embodiment, the insulating layer 33 is formed to have a thickness of at least 25 µm, such that the metal members 34 of the separate plates 31a and 31b may be spaced apart from each other by a distance of at least 25 µm.

Figure 7:
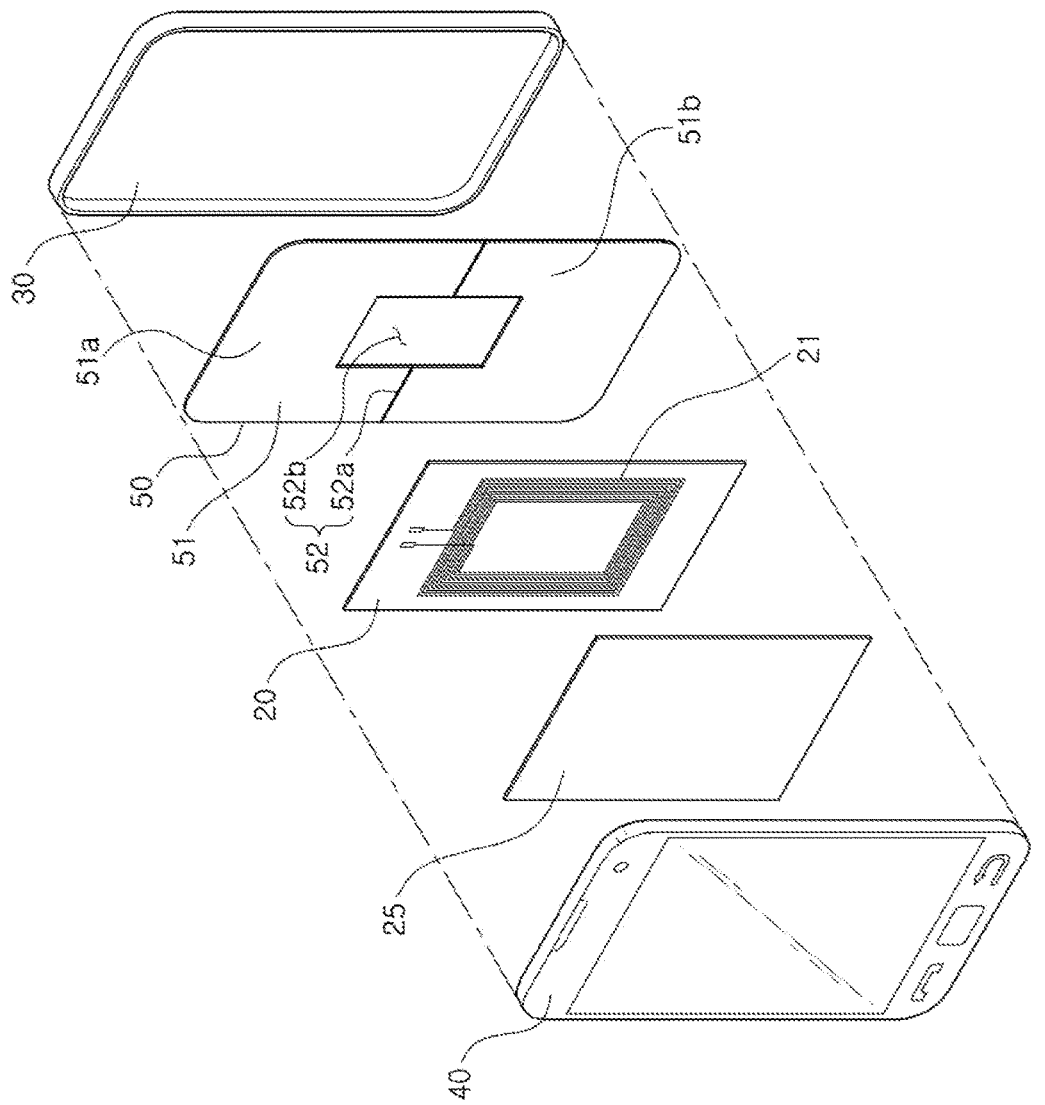
FIG. 7 is an exploded perspective view schematically illustrating another embodiment of a portable terminal according to the present disclosure.

FIG. 7 is an exploded perspective view schematically illustrating a portable terminal according to another embodiment in the present disclosure.

The portable terminal according to the present embodiment may be configured similarly to the portable terminal of FIG. 2 described above, other than a configuration difference in a cover and a heat radiation plate.

Therefore, a description of the same configuration will be omitted, and the configurations that are different will be described in detail.

Referring to FIG. 7, the portable terminal according to the present embodiment includes a heat radiating member 50. The heat radiating member 50 may be a conductive plate. In this example, the heat radiating member 50 is disposed between the coil substrate 20 and the cover 30, and transfers heat generated by the coil substrate 20 to the cover 30.

To this end, the heat radiating member 50 is formed in a flat plate shape or a sheet shape, and includes a plurality of separate plates 51a and 51b. The separate plates 51a and 51b may be formed of a material having conductivity. For example, the separate plates 51a and 51b may be formed of a metal such as aluminum.

At least one of the separate plates 51a and 51b may have an insulating layer 33 formed on the outer surface of the metal member 34 as illustrated in FIG. 5 or FIG. 6.

In addition, similar to the embodiments described above, in an example in which the separate plates 51a and 51b are formed of an aluminum material, the insulating layer 33 may be an oxidation film formed by anodizing the aluminum material.

According to this example, even when the separate plates 51a and 51b are coupled to each other through a physical contact, an electrical insulation between the separate plates 51a and 51b may be maintained by the insulating layer 33.

In addition, at least one extension part 52b may be formed in the heat radiating member 50. The extension part 52b may be formed on a contact line 52a on which the separate plates 51a and 51b are in contact with each other, and may be formed to partially space the separate plates 51a and 51b that are in contact with each other apart from each other.

Similar to the embodiments described above, an interior of the extension part 52b may be formed as an empty space, or may be filled with an insulating member such as a resin.

Meanwhile, in the present embodiment, the cover 30 may be formed of an insulating material, not the conductive material. However, the material of the cover 30 is not limited thereto, and the cover 30 of the embodiments described above having conductivity may also be used, as needed. In this case, the contact line 52*a* of the heat radiating member 50 and the contact line of the cover 30 may be disposed to be parallel to each other. However, the contact line 52*a* of the heat radiating member 50 and the contact line of the cover 30 are not limited thereto.

Since the portable terminal according to the present embodiment configured as described above includes the heat radiating member formed of the conductive material, heat generated by the coil substrate or the portable terminal may be effectively radiated. In addition, although the heat radiating member is formed of a conductive material, wireless charging or wireless communications may be efficiently performed by a cut portion formed in the heat radiating member.

As set forth the above, according to the embodiments in the present disclosure, even in the case that the plurality of separate plates are disposed to be in contact with each other, the conductive plate may secure electrical insulation between the separate plates by the insulating layer formed on the separate plates. Therefore, because there is no need to space the separate plates from each other or interpose the separate insulating member between the separate plates, the portable terminal may be easily manufactured and a design thereof may be easily utilized.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A conductive plate of a terminal disposed on a side of a coil substrate for wirelessly charging the terminal, comprising:
   metal members each having a plate shape; and
   an insulating layer disposed on a surface of at least one of the metal members to insulate the metal members from each other,
   wherein the metal members are coupled to each other to configure a planar contour surface.

2. The conductive plate of claim 1, wherein the conductive plate is a rear cover of the terminal.

3. The conductive plate of claim 1, wherein the conductive plate is a heat radiating member to be disposed between a rear cover of the terminal and the coil substrate.

4. The conductive plate of claim 1, wherein the insulating layer comprises an oxidation film formed on at least one of the metal members.

5. The conductive plate of claim 1, wherein the metal members comprise aluminum, and
   the insulating layer comprises an oxidation film formed by anodizing at least one of the metal members.

6. The conductive plate of claim 1, wherein a contact line joining the metal members is disposed to overlap with a winding center of the coil substrate.

7. The conductive plate of claim 1, further comprising an extension part disposed on a contact line at which the metal members meet to partially space the metal members apart from each other.

8. The conductive plate of claim 7, wherein the extension part has a size corresponding to an inner space of the coil substrate.

* * * * *